United States Patent
Erneta et al.

(10) Patent No.: US 8,552,142 B2
(45) Date of Patent: Oct. 8, 2013

(54) COPOLYMERS OF E-CAPROLACTONE AND GLYCOLIDE FOR MELT BLOWN NONWOVEN APPLICATIONS

(71) Applicant: Ethicon, Inc., Somerville, NJ (US)

(72) Inventors: Modesto Erneta, Princeton Junction, NJ (US); Dennis D. Jamiolkowski, Long Valley, NJ (US); Jianguo J. Zhou, Bethlehem, PA (US); Sasa Andjelic, Nanuet, NY (US)

(73) Assignee: Ethicon, Inc., Somerville, NJ (US)

( * ) Notice: Subject to any disclaimer, the term of this patent is extended or adjusted under 35 U.S.C. 154(b) by 0 days.

(21) Appl. No.: 13/630,062

(22) Filed: Sep. 28, 2012

(65) Prior Publication Data

US 2013/0029556 A1    Jan. 31, 2013

Related U.S. Application Data

(62) Division of application No. 12/107,614, filed on Apr. 22, 2008, now Pat. No. 8,278,409.

(51) Int. Cl.
*C08G 63/08* (2006.01)

(52) U.S. Cl.
USPC ........... 528/354; 442/400; 528/343; 528/357; 528/361

(58) Field of Classification Search
USPC ................. 442/100; 528/343, 354, 357, 361
See application file for complete search history.

(56) References Cited

U.S. PATENT DOCUMENTS

| 3,978,185 A | 8/1976 | Butin et al. |
| 4,605,730 A | 8/1986 | Shalaby et al. |
| 4,700,704 A * | 10/1987 | Jamiolkowski et al. ...... 606/230 |
| 5,133,739 A | 7/1992 | Bezwada et al. |
| 5,614,298 A * | 3/1997 | Tanaka et al. ................. 428/219 |
| 7,148,315 B2 | 12/2006 | Erneta et al. |
| 7,435,789 B2 | 10/2008 | Shalaby |
| 7,968,656 B2 * | 6/2011 | Andjelic et al. .............. 525/437 |
| 2005/0171299 A1 | 8/2005 | Shalaby |

FOREIGN PATENT DOCUMENTS

| EP | 0441322 A1 | 8/1991 |
| EP | 0848089 A2 | 6/1998 |
| EP | 1375557 A1 | 1/2004 |

OTHER PUBLICATIONS

Melt blown techhnoglogy by Dahiya et al (Apr. 2004, University of Tennesee).*

* cited by examiner

*Primary Examiner* — Gregory Listvoyb
(74) *Attorney, Agent, or Firm* — Roberts Mlotkowski Safran & Cole, P.C.

(57) ABSTRACT

Copolymers exhibiting the following combinations of properties, including without limitation, ε-caprolactone in an amount ranging from about 12 to about 70 mole percent, glycolide in an amount ranging from about 30 to about 88 mole percent, crystallinity ranging from about 10 to about 50% as measured by WAXD or about 10 to about 50 J/g as measured by DSC, and an inherent viscosity ranging from about 0.5 to about 1.45 dL/g as measured in a 0.1 g/dl solution of HFIP at 25° C.; a method for melt blowing such copolymers and nonwoven constructs produced therefrom are described herein.

15 Claims, No Drawings

COPOLYMERS OF ε-CAPROLACTONE AND GLYCOLIDE FOR MELT BLOWN NONWOVEN APPLICATIONS

This application is a divisional of co-pending application Ser. No. 12/107,614, filed on Apr. 22, 2008, the entire contents of which are hereby incorporated by reference and for which priority is claimed under 35 U.S.C. §120.

FIELD

This invention relates to copolymers of ε-caprolactone and glycolide, a method for melt blowing such copolymers, and nonwoven constructs produced therefrom.

BACKGROUND

In the preparation of bioabsorbable polymers, among the most widely studied lactones are ε-caprolactone, lactide and glycolide. Recent attention has been focused on improving the physical and biological properties of polymers and copolymers derived from these specific lactones.

Attempts to optimize the properties of copolymers of ε-caprolactone and glycolide are known, such as those proposed in U.S. Pat. Nos. 4,605,730 and 4,700,704. These patents propose single and two-stage polymerization processes for preparing the copolymers. Of particular interest is a two-stage polymerization process. Specifically, the aforementioned patents propose preparing a low molecular weight prepolymer of ε-caprolactone and glycolide, and then polymerizing in situ the resulting prepolymer with glycolide to produce a crystalline copolymer.

U.S. Pat. No. 5,133,739 proposes a crystalline copolymer comprising the reaction product of a predominant amount of a high molecular weight prepolymer of caprolactone and glycolide, and the balance glycolide. A surgical device such as a surgical filament, in particular a surgical suture, prepared by injection molding or melt spinning the crystalline copolymer is also proposed.

U.S. Pat. No. 7,148,315 proposes a monomer addition methodology to adjust monomer addition rates to a polymerization reactor for controlling bioabsorbable copolymer structure, improvement of monomer conversion, control of reaction temperature, and reduced reaction time. The technology is said to have utility in the copolymerization of monomers with different reactivity ratios, such as glycolide/lactide copolymers and glycolide/caprolactone copolymers. Monomer reactivity ratios and reaction kinetics are utilized to adjust monomer addition rates.

Certain aspects of the preparation of nonwoven constructs from synthetic, bioabsorbable polymers by melt blown extrusion are known. Unfortunately, the copolymers described in the aforementioned patents do not provide the most desirable properties when fabricated into nonwoven constructs. Significantly, when the copolymers are used to prepare nonwoven constructs, the copolymers cannot be melt blown or the resultant fiber diameter is undesirably large.

Therefore, it would be most desirable to prepare a copolymer of ε-caprolactone and glycolide which can be fabricated into useful nonwoven constructs. In particular, it would be desirable to prepare such a copolymer which can be melt blown into a nonwoven construct that exhibits outstanding physical and biological properties. Additionally, it would be desirable to prepare such a nonwoven construct of fine diameter. Such fine diameter construct may provide advantageous properties beyond mechanical and biological properties, such as diffusional properties important in drug release.

SUMMARY

Disclosed herein are copolymers of ε-caprolactone and glycolide suitable for fabrication into melt blown nonwoven constructs. Also disclosed are methods of preparation of the nonwoven constructs.

The copolymers disclosed herein exhibit the following combinations of properties, including without limitation, ε-caprolactone in an amount ranging from about 12 to about 70 mole percent, glycolide in an amount ranging from about 30 to about 88 mole percent, crystallinity ranging from about 10 and about 50% as measured by Wide Angle X-Ray Diffraction (WAXD) or about 10 to about 50 J/g as measured by the thermoanalytical technique of Differential Scanning calorimetry (DSC), and an inherent viscosity ranging from about 0.5 to about 1.45 dL/g as measured in a 0.1 g/dL solution of hexafluoroisopropanol (HFIP) at 25° C.

In another aspect, the copolymer comprises the reaction product of a prepolymer of ε-caprolactone and glycolide. The mole ratio of ε-caprolactone to glycolide in the prepolymer is between about 20:80 to about 80:20, and the balance glycolide.

In yet another aspect, provided is a method of melt blowing a copolymer. The method comprises the steps of providing a copolymer having ε-caprolactone in an amount ranging from about 12 to about 70 mole percent, glycolide in an amount ranging from about 30 to about 88 mole percent, crystallinity ranging from about 10 and about 50% as measured by WAXD or about 10 to about 50 J/g as measured by DSC, and an inherent viscosity ranging from about 0.5 to about 1.45 dL/g as measured in a 0.1 g/dL solution of HFIP at 25° C.; extruding the copolymer through a die assembly, the die assembly having a plurality of spinnerets, to form filament strands; attenuating the filament strands with hot air to form microfibers; collecting the microfibers on a collector screen; and cooling and solidifying the microfibers to form a nonwoven construct comprising microfibers having fiber diameters ranging from about 1 to 8 μm and preferably from about 1 to about 6 μm.

In another aspect, provided is the nonwoven construct formed by the melt blown extrusion of the aforementioned copolymer.

DETAILED DESCRIPTION

The copolymers disclosed herein are generally semi-crystalline copolymers of ε-caprolactone and glycolide, having a molecular weight as reflected by their inherent viscosity and the ability to develop a degree of crystallinity which renders the copolymers suitable for melt blown extrusion. The overall mole ratio of ε-caprolactone to glycolide for the copolymers disclosed herein ranges from about 12:88 to about 70:30, and preferably from about 20:80 to about 40:60.

In an alternate embodiment, the copolymers disclosed herein are comprised of the reaction product of a prepolymer of ε-caprolactone and glycolide having a mole ratio of ε-caprolactone to glycolide in the prepolymer is between about 20:80 to about 80:20, and the balance glycolide.

The inherent viscosity of the semi-crystalline copolymers of ε-caprolactone and glycolide described herein ranges from about 0.5 to about 1.45 dL/g, and preferably from about 0.74 to about 1.45 dL/g in a 0.1 g/dL solution of HFIP at 25° C. A copolymer with an inherent viscosity below about 0.5 dL/g generally lacks sufficient viscosity to provide suitable melt strength for extrusion, and a copolymer with an inherent viscosity above about 1.45 dl/g is generally too viscous for melt blown processing at the temperatures desired to avoid polymer degradation.

Advantageously, the crystallinity of the copolymers is between about 10 and about 50% as measured by WAXD or about 10 to about 50 J/g as measured by DSC, preferably between about 25 and about 35% as measured by WAXD or about 25 to about 35 J/g as measured by DSC so that nonwoven constructs prepared from the copolymer can maintain their dimensional integrity at elevated temperatures. Depending upon the application, the crystallinity of the copolymers may range from about 10 to about 20%, as measured by WAXD, or about 10 to about 20 J/g, as measured by DSC.

The copolymers disclosed herein may be prepared by the methods disclosed in U.S. Pat. Nos. 5,133,739 and 7,148,315, which are incorporated by reference herein in their entirety. For example, the copolymers may be prepared by first preparing the prepolymer of ε-caprolactone and glycolide, and then polymerizing the prepolymer with glycolide. The prepolymer can be prepared by polymerizing ε-caprolactone and glycolide in the presence of an organometallic catalyst and an initiator at elevated temperatures. The organometallic catalyst is preferably a tin-based catalyst, e.g. stannous octoate, and is present in the monomer mixture at a mole ratio of monomer-to-catalyst ranging from about 15,000 to about 80,000/1. The initiator is typically an alkanol, a glycol, a hydroxyacid or an amine, and is present in the monomer mixture at a mole ratio of monomer to initiator ranging from about 25 to 2000/1. The polymerization is typically carried out at a temperature ranging from about 120 to about 200° C., or about 160 to about 190° C., until the desired molecular weight and viscosity are achieved.

In one form, the conversion of monomer to prepolymer is greater than 95 mole percent to avoid the formation of undesirable copolymeric hard segments of ε-caprolactone and glycolide during the subsequent polymerization with glycolide. In one form, the conversion of monomer to prepolymer is greater than about 98 mole percent. Conversion of monomer to prepolymer is measured by weight loss methods, e.g. at 110° C. in vacuo until constant weight is achieved.

After the prepolymer is prepared, the temperature of the reaction mixture is increased to about 230° C., and then molten glycolide is added with vigorous stirring to form a homogeneous solution of the glycolide in the prepolymer. The polymerization reaction is allowed to proceed for about 15 to about 30 minutes at an elevated temperature, and then the temperature is lowered to about 200° C. to avoid possibly degrading polycaprolactone moieties. The polymerization may continue at this temperature until the desired molecular weight and percent conversion is achieved for the copolymer, which will typically take about 1 to about 3 hours.

Once the desired copolymer disclosed herein is prepared, a useful nonwoven construct may be produced by a melt blown nonwoven process. In many surgical applications, nonwoven fabric possessing a fine filament diameter having a fiber diameter ranging from about 1 to about 8 μm or from about 1 to about 6 μm is sought.

In accordance herewith, a melt blown nonwoven process having utility herein will now be described. A typical system for use in a melt blown nonwoven process consists of the following elements: an extruder, a transfer line, a die assembly, hot air generator, a web formation system, and a winding system.

As is well known to those skilled in the art, an extruder consists of a heated barrel with a rotating screw positioned within the barrel. The main function of the extruder is to melt the copolymer pellets or granules and feed them to the next element. The forward movement of the pellets in the extruder is along the hot walls of the barrel between the flights of the screw. The melting of the pellets in the extruder results from the heat and friction of the viscous flow and the mechanical action between the screw and the walls of the barrel. The transfer line will move molten polymer toward the die assembly. The transfer line may include a metering pump in some designs. The metering pump may be a positive-displacement, constant-volume device for uniform melt delivery to the die assembly.

As may be appreciated, the die assembly is a critical element of the melt blown process. It has three distinct components: a copolymer feed distribution system, spinnerretts (capillary holes), and an air distribution system. The copolymer feed distribution introduces the molten copolymer from the transfer line to distribution channels/plates to feed each individual capillary hole uniformly and is thermal controlled. From the feed distribution channel the copolymer melt goes directly to the die capillary. The copolymer melt is extruded from these holes to form filament strands which are subsequently attenuated by hot air to form fine fibers. During processing, the entire die assembly is heated section-wise using external heaters to attain the desired processing temperatures. We found that a die temperature of about 210 to about 280° C. was useful. It should be noted however that very high temperatures such as above about 280° C. may result in excessive degradation in certain applications. A preferred die temperatures range was from about 210 to about 260° C. We found that a die pressure of about 100 to about 2,000 psi was useful. A preferred die pressure range was from about 100 to about 1200 psi. The air distribution system supplies the high velocity hot air. The high velocity air is generated using an air compressor. The compressed air is passed through a heat exchange unit, such as an electrical or gas heated furnace, to heat the air to desired processing temperatures. We found that an air temperature of about 200 to about 350° C. was useful. A preferred air temperatures range was from about 220 to about 300° C. We found that an air pressure of about 5 to about 50 psi was useful. A preferred air pressure range was from about 5 to about 30 psi. It should be recognized that the air temperature and the air pressure may be somewhat equipment dependent, but can be determined through appropriate experiment.

As soon as the molten copolymer is extruded from the die holes, high velocity hot air streams attenuate the copolymer streams to form microfibers. With the equipment employed, we found that a screw speed of about 1 to about 100 RPM was adequate. As the hot air stream containing the microfibers progresses toward the collector screen, it draws in a large amount of surrounding air that cools and solidifies the fibers. The solidified fibers subsequently get laid randomly onto the collecting screen, forming a self-bonded web. The collector speed and the collector distance from the die nosepiece can be varied to produce a variety of melt blown webs. With the equipment employed, we found that a collector speed of about 0.1 to about 100 m/min was adequate. Typically, a vacuum is applied to the inside of the collector screen to withdraw the hot air and enhance the fiber laying process.

The melt blown web is typically wound onto a tubular core and may be processed further according to the end-use requirement. The nonwoven construct formed by the melt blown extrusion of the aforementioned copolymer is comprised of microfibers having a fiber diameter ranging from about 1 to about 8 μm, preferably from about 1 to about 6 μm.

Specific embodiments of the present invention will now be described further, by way of example. While the following examples demonstrate certain embodiments of the invention, they are not to be interpreted as limiting the scope of the invention, but rather as contributing to a complete description of the invention.

EXAMPLES

The method used to measure the diameter of the microfibers of the melt blown nonwoven webs described in Examples 6 and 7 will first be described; it is a typical procedure. Five locations along the width of the melt blown nonwoven web were selected to represent different locations for examination. Five individual pieces measuring approximately 1 cm by 1 cm were then cut. An optical microscope (OM) with a calibration scale was used to measure the diameter of single-fibers on the specimens. Alternately a scanning electronic microscope (SEM) can be used instead of an optical microscope. The webs of Examples 6 and 7 were measured by both techniques, OM and SEM; both methods produced similar values. Microfibers were randomly selected for examination. Measurements were made on 20 individual single-fibers selected from each of the 1×1 cm specimen. Thus, a total of 100 measurements per web sample were collected, which represents the distribution of fiber diameter for the nonwoven web. The method employed to measure the diameter of the microfibers of the melt blown nonwoven webs could also be modified to measure the diameter of the microfibers of nonwoven constructs.

Example 1

Polymer Leading to an Inventive Melt Blown Nonwoven [as Shown in Example 6]

This example will illustrate the preparation of a segmented ABA type, ε-caprolactone/glycolide copolymer leading to an inventive melt blown nonwoven. In the copolymer, the center segment, B, is an ε-caprolactone/glycolide prepolymer of 45/55 molar ratio, and the A segments are polymeric segments based on glycolide only. Segment B comprises 66.67 mole percent of the total ABA copolymer, and segments A comprise 33.33 mole percent. The overall molar content of the copolymer is 30 mole % ε-caprolactone and 70 mole % glycolide. The overall molar ratio of monomers/diethylene glycol is 600 and the overall molar ratio of monomers to catalyst is 55,000.

Synthesis of the Center Segment B

A dried reactor provided with stirrer and jacket with heating medium is charged with 4,447 gm (39 mole) ε-caprolactone, 5,528 gm (47.6 mole) glycolide, 20.55 ml (0.2165 mole) diethylene glycol and 7.16 ml of a 0.33M stannous octoate in toluene solution (0.002363 moles). The reactor is put under vacuum for about 25 minutes followed by purging with nitrogen. The vacuum/nitrogen purge cycle is repeated once more. The reaction mixture is heated under nitrogen at atmospheric pressure to 198° C. and maintained at this temperature for about 6 hours.

Capping the Center Segment B with A Segments

In the next step, an additional 5,025 grams (43.3 mole) of molten glycolide is added to the prepolymer in the reactor from a melt tank. The temperature of the heating medium is raised to 215° C. to dissolve the prepolymer into the added molten glycolide. After about 10 to 15 minutes, the temperature of the heating medium is dropped to 207° C. Total reaction time at 207° C. is about 90 minutes. The copolymer is isolated, ground, sieved and dried 18 hours under vacuum at ambient temperature and 24 hours at 110° C. to remove any unreacted monomers. The copolymer has an IV of 1.40 dL/g and a final polymerized-ε-caprolactone-to-polymerized-glycolide molar ratio of 30/69.8, as determined by NMR analysis.

Example 2

Polymer Leading to a Non-Inventive Melt Blown Nonwoven

This example will illustrate the preparation of a segmented ABA type, ε-caprolactone/glycolide copolymer leading to an inventive melt blown nonwoven. In the copolymer, the center segment, B, is a prepolymer of 40/60 molar ratio, ε-caprolactone/glycolide and the A segments are polymeric segments from glycolide. Segment B comprises 75 mole percent of the total ABA copolymer, and segments A comprise 25 mole percent of the total ABA copolymer. The overall molar content of the copolymer is 30 mole % ε-caprolactone and 70 mole % glycolide. The overall molar ratio of monomers/diethylene glycol is 600 and the overall molar ratio of monomers to catalyst is 55,000.

Synthesis of the Center Segment B

A dried reactor provided with stirrer and jacket with heating medium is charged with 8895 gm (77.9 mole) ε-caprolactone, 13568 gm (116.9 mole) glycolide, 41.09 ml (0.4329 mole) diethylene glycol and 14.31 ml of a 0.33M stannous octoate in toluene solution (0.004722 moles). The reactor is put under vacuum for about 25 minutes followed by purging with nitrogen. The vacuum/nitrogen purge cycle is repeated once more. The reaction mixture is heated under nitrogen at atmospheric pressure to 198° C. and maintained at this temperature for about 6 hours.

Capping the Center Segment B with A Segments

In the next step, an additional 7,538 grams (64.9 mole) of molten glycolide is added to the prepolymer in the reactor from a melt tank. The temperature of the heating medium is raised to 215° C. to dissolve the prepolymer into the added molten glycolide. After about 10 to 15 minutes, the temperature of the heating medium is dropped to 207° C. Total reaction time at 207° C. is about 70 minutes. The copolymer is isolated, ground, sieved and dried 18 hours under vacuum at ambient temperature and 24 hours at 110° C. to remove any unreacted monomers. The copolymer has an IV of 1.54 dL/g.

Example 3

Polymer Leading to an Inventive Melt Blown Nonwoven

This example was made in the similar fashion as the inventive example 1, except that the overall molar content of the center block was 55.56 mole % instead of 66.67 mole %. The overall molar ratio of caprolactone to glycolide was 25/75. Other compositional characteristics of this material can be found in Table 1. The copolymer has an IV of 1.38 dL/g.

Example 4

Polymer Leading to a Non-Inventive Melt Blown Nonwoven

This example was made in the similar fashion as the inventive example 3 except that the initiator ratio was 1,300, instead of 600, which resulted in a higher molecular weight polymer. As will be described in Example 8, this copolymer could not be successfully converted to a fine diameter nonwoven fabric by the melt blown nonwoven process. The copolymer has an IV of 1.47 dL/g.

Example 5

Polymer Leading to a Non-Inventive Melt Blown Nonwoven

This example was made in the similar fashion as the comparative example 5 except the overall molar ratio of ε-caprolactone to glycolide was 23/77 and the initiator ratio was 1,250; this resulted in a material having both a high molecular weight and a higher glycolide content. The copolymer has an IV of 1.60 dL/g.

TABLE 1

ABA Segmented ε-Caprolactone/Glycolide Copolymer Compositions and Properties; Segment
B is Composed of ε-Caprolactone/Glycolide, While Segment A is Composed of Glycolide Only.

| Inventive Examples and Controls | Overall molar composition | | | Individual molar composition | | IV (dL/g) | Initiator mole ratio (monomer/ DEG) | Catalyst mole ratio (monomer/ catalyst) |
|---|---|---|---|---|---|---|---|---|
| | ε-cap/gly mole ratio | Segment B (mole %) | Segment A (mole %) | B mole ratio | A mole ratio | | | |
| Ex. 1 | 30/70 | 66.66 | 33.33 | 45/55 | 100 | 1.40 | 600 | 55,000 |
| Ex. 2 | 30/70 | 75.00 | 25.00 | 40/60 | 100 | 1.54 | 600 | 55,000 |
| Ex. 3 | 25/75 | 55.56 | 44.44 | 45/55 | 100 | 1.38 | 600 | 55,000 |
| Ex. 4 control | 25/75 | 55.56 | 44.44 | 45/55 | 100 | 1.47 | 1,300 | 55,000 |
| Ex. 5 control | 23/77 | 51.11 | 48.89 | 45/55 | 100 | 1.60 | 1,250 | 57,500 |

The data of Table 1 above summarizes the composition variations of the copolymers of Examples 1 to 5.

Table 2 below summarizes the crystallization behavior of copolymer Examples 1 to 5.

TABLE 2

Crystallization Properties of the ε-Caprolactone/Glycolide Copolymers of Example 1 to 5.

| Example | Resin IV (dl/g) | Crystallization Rate[1] (W/g ° C.) | Relative Crystallization Rate | $T_m$ (° C.) | Heat of Fusion of Resin by $DSC^2$ (J/g) |
|---|---|---|---|---|---|
| 1 | 1.40 | 0.0013 | 0.33 X | 204 | 21 |
| 2 | 1.54 | Crystallization under given test conditions[1] is non-detectable | | 180 | 19 |
| 3 | 1.38 | 0.00006 | 0.015 X | 190 | 28 |
| 4 | 1.47 | 0.0041 | 1.0 X | 204 | 33 |
| 5 | 1.60 | 0.056 | 13 X | 210 | 27 |

[1]Crystallization rate was obtained by DSC cooling from the melt (240° C.) with a constant cooling rate of 10° C./min.
[2]Heat of fusion obtained from the first heat with a constant heating rate of 10° C./min. Sample size 3 to 10 mg.
Note:
All DSC results presented herein were obtained under the conditions detailed above.

In many surgical applications, nonwoven fabric possessing a fine filament diameter is sought. To produce such a nonwoven fabric by the melt blown nonwoven process requires the melt to exhibit a relatively low melt viscosity. To achieve this low viscosity, the polymer needs to have a limited molecular weight to prevent the need to use excessively high temperature, leading to polymer degradation during processing. In addition, in many instances, polymers that crystallize relatively quickly during the melt blown process may offer advantages. These advantages include better processability; for instance, one may not need to use a "release paper". Fabric shrinkage may be avoided resulting in better dimensional stability when the nonwoven can be rapidly crystallized during fabrication.

Fast crystallization kinetics alone do not insure successful results. For instance, Example 5 in Tables 1 and 2 exhibits very rapid crystallization kinetics. Of the five polymers listed, the resin of Example 5 has the highest overall glycolide level (77%) and the highest melting point (210° C.). It also has the highest molecular weight (IV=1.60 dL/g). This combination of properties makes this resin extremely difficult to process by the melt blown nonwoven method into fine fiber diameter fabric. This is due to high melt viscosity, despite favorable fast crystallization kinetics.

The copolymer of Example 4, as shown in Tables 1 and 2, has relatively high molecular weight (IV=1.47) and the highest crystallization level (ΔH=33 J/g) among the polymers presented. As will be shown in Example 8, due to the high melt viscosity of this copolymer, very high temperatures needed to be employed to process this material into melt blown constructs. Despite these extreme processing conditions, the final fiber size (9-12 μm) of the construct is still quite large. Such high temperatures (280° C.) may also prematurely degrade the polymer, leading to possible biocompatibility problems or possible loss in mechanical properties.

The copolymer of Example 3, as shown in Tables 1 and 2, has lower molecular weight (IV=1.38 dL/g) and consequently lower melt viscosity. This low viscosity allows for the production of nonwovens with desirable fine fiber diameter (2.5-6.0 μm), as will be shown in Example 7. However, we have observed that this lower molecular weight polymer exhibited a much slower crystallization rate. Although we do not want to be held to scientific theory, we believe that this lower molecular weight resin, possessing a relatively greater number of hydroxyl groups per unit weight, will exhibit an increased alcoholysis rate. Alcoholysis is a form of transesterification and can lead to a more randomized sequence distribution. Note that the lower melting point (190° C.) is supportive of greater randomness caused by transesterification. Slower crystallization kinetics can affect processing because the fabric produced may lack dimensional stability. However, this resin still has a relatively higher crystallinity level, which may not be desirable in some surgical implants. As may be appreciated, in certain applications a lower level of crystallinity may be desired whereas in others, a higher level of crystallinity may be desired.

The polymer of Example 1 possess properties advantageous in attempting to produce fine diameter nonwoven constructs by the melt blowing process. Lower molecular weight (IV=1.40 dL/g) allows for lower melt viscosity, further allowing the cooling melt streams to be stretched out more resulting in finer filament formation during melt blown nonwoven processing. It is pointed out that the polymer of Example 1 could be processed at a much lower processing temperature (250° C.). Lower processing temperatures lead to less degradation in terms of loss of molecular weight, as well as less transesterification leading to less scrambling of the sequence distribution. Retaining the blocky molecular structure allows the forming filaments to crystallize easier, helping to establish dimensional stability.

Unexpectedly, the copolymer of Example 1 crystallizes much faster than the comparable molecular weight copolymer of Example 3. This is true even though the overall glycolide content of the copolymer of Example 1 is lower than the copolymer of Example 3. The copolymer of Example 1, with a heat of fusion of 21 J/g, also provides a lower crystallinity level, which may have advantage in various medical devices.

The copolymer of Example 2 has relatively higher molecular weight (IV=1.54). Due to the high melt viscosity of this copolymer, very high temperatures (285° C.) needed to be employed to process this material into melt blown constructs. Despite these extreme processing conditions, the final fiber size (8-11 μm) of the construct is still quite large. Such high temperatures (285° C.) may also prematurely degrade the polymer, leading to possible biocompatibility problems or possible loss in mechanical properties.

Inventive Example 6

Processing of the ε-Caprolactone/Glycolide Copolymer of Example 1 Into Inventive Melt Blown Nonwoven Constructs This example illustrates the processing of the ε-caprolactone/glycolide copolymer of Example 1 into inventive melt blown nonwoven constructs. On a six-inch melt blown nonwoven line equipped with single screw extruder, the ε-caprolactone/glycolide copolymer of Example 1, having a composition of 30 mole percent polymerized ε-caprolactone and 70 mole percent of polymerized glycolide, and having an IV of 1.40 dL/g, was extruded into melt blown nonwoven constructs. The melt blown line was of standard design as described by Buntin, Keller and Harding in U.S. Pat. No. 3,978,185.

The process employed involved feeding the solid polymer pellets into a feeding hopper on extruder. The extruder was equipped with a 1¼" diameter single screw with three heating zones. The extruder gradually rendered the polymer molten and conveyed the melt through a connector or transfer line. Finally, the molten polymer was pushed into a die assembly containing many capillary holes (arranged in the traditional linear fashion) through which emerged small diameter fibers. The fiber diameter was attenuated using high velocity hot air at the die exit as the fibers emerged. The fibrous web ensuing from the die assembly was deposited on a rotating collection drum positioned about 6 inches from the die exit. The web then conveyed onto a wind up spool. The die used had 210 capillary holes with a diameter of 0.014 inch per hole. The processing conditions and resulted properties of the melt blown nonwoven constructs are listed in the following Table 3.

TABLE 3

Processing Conditions and Resulted Melt Nonwoven Properties.

| | Sample | | |
|---|---|---|---|
| | 1 | 2 | 3 |
| Processing Conditions: | | | |
| Die Temperature (° C.) | 247 | 248 | 249 |
| Die Pressure (psi) | 275 | 275 | 275 |
| Air Temperature (° C.) | 250 | 250 | 250 |
| Air Pressure (psi) | 17 | 17 | 17 |
| Extruder Speed (rpm) | 5.3 | 5.7 | 5.5 |
| Throughput (grams/hole/minute) | 0.239 | 0.239 | 0.239 |
| Collector Speed (meters/minute) | 4.0 | 2.0 | 1.4 |
| Nonwoven Properties: | | | |
| Base Weight (gsm) | 40 | 81 | 115 |
| Fiber Diameter (μm) | 2.5-6.0 | 2.5-6.0 | 2.5-6.0 |
| Bust Strength (psi) | 13.50 | 16.25 | 19.25 |
| Peak Tensile (N) | 10.3 | 17.9 | 28.2 |

TABLE 3-continued

Processing Conditions and Resulted Melt Nonwoven Properties.

| | Sample | | |
|---|---|---|---|
| | 1 | 2 | 3 |
| Air Permeability (CFM) | 130.2 | 85.1 | 47.3 |
| Average Pore Size (μm) | 17.1 | 14.8 | 13.6 |
| Crystallinity (%) by XRD | 26.0-31.1 | 26.0-31.1 | 26.0-31.1 |
| Heat of fusion (J/g) by DSC | 27 | 27 | 27 |

The above table indicates the fiber diameter in the melt blown nonwoven of this example is about 2.5 to 6.0 micrometers.

Inventive Example 7

Processing of the ε-Caprolactone/Glycolide Copolymer of Example 3 into Inventive Melt Blown Nonwoven Constructs This example illustrates the processing of the ε-caprolactone/glycolide copolymer of Example 3 into inventive melt blown nonwoven constructs. On a six-inch melt blown nonwoven line equipped with single screw extruder, the ε-caprolactone/glycolide copolymer of Example 3, having a composition of 25 mole percent polymerized ε-caprolactone and 75 mole percent of polymerized glycolide, and having an IV of 1.38 dig, was extruded into melt blown nonwoven constructs. The melt blown line was of standard design as described by Buntin, Keller and Harding in U.S. Pat. No. 3,978,185.

The process employed involved feeding the solid polymer pellets into a feeding hopper on extruder. The extruder was equipped with a 1¼" diameter single screw with three heating zones. The extruder gradually rendered the polymer molten and conveyed the melt through a connector or transfer line. Finally, the molten polymer was pushed into a die assembly containing many capillary holes (arranged in the traditional linear fashion) through which emerged small diameter fibers. The fiber diameter was attenuated using high velocity hot air at the die exit as the fibers emerged. The fibrous web ensuing from the die assembly was deposited on a rotating collection drum positioned about 6 inches from the die exit. The web then conveyed onto a wind up spool. The die used had 210 capillary holes with a diameter of 0.014 inch per hole. The processing conditions and resulted properties of the melt blown nonwoven constructs are listed in the following Table 4.

TABLE 4

Processing Conditions and Resulted Melt Nonwoven Properties.

| | Sample | |
|---|---|---|
| | 1 | 2 |
| Processing Conditions: | | |
| Die Temperature (° C.) | 237 | 236 |
| Die Pressure (psi) | 350 | 350 |
| Air Temperature (° C.) | 250 | 250 |
| Air Pressure (psi) | 17 | 17 |
| Extruder Speed (rpm) | 8.1 | 8.1 |
| Throughput (grams/hole/minute) | 0.188 | 0.188 |
| Collector Speed (meters/minute) | 4.2 | 2.0 |

TABLE 4-continued

Processing Conditions and Resulted Melt Nonwoven Properties.

|  | Sample | |
|---|---|---|
|  | 1 | 2 |
| Nonwoven Properties: | | |
| Base Weight (gsm) | 38 | 81 |
| Fiber Diameter (μm) | 2.5-6.0 | 2.5-6.0 |
| Bust Strength (psi) | 14.75 | 18.88 |
| Peak Tensile (N) | 15.8 | 23.1 |
| Air Permeability (CFM) | 147.6 | 44.1 |
| Average Pore Size (μm) | 19.9 | 14.2 |
| Crystallinity (%) by XRD | 36.7-40.6 | 36.7-40.6 |
| Heat of fusion (J/g) by DSC | 37 | 37 |

The above table indicates the fiber diameter in the melt blown nonwoven of this example is about 2.5 to 6.0 micrometers.

Comparative Example 8

Processing of the ε-Caprolactone/Glycolide Copolymer of Example 4 into Non-Inventive Melt Blown Nonwoven Constructs This example illustrates the processing of the ε-caprolactone/glycolide copolymer of Example 4 into comparative non-inventive melt blown nonwoven constructs. On a six-inch melt blown nonwoven line equipped with single screw extruder, the ε-caprolactone/glycolide copolymer of Example 4 having a composition of 25 mole percent of polymerized ε-caprolactone and 75 mole percent of polymerized glycolide, and having an IV of 1.47 dL/g, was extruded into melt blown nonwovens constructs. The melt blown line was of standard design as described by Buntin, Keller and Harding in U.S. Pat. No. 3,978,185.

The process employed involved feeding the solid polymer pellets into a feeding hopper on extruder. The extruder was equipped with a 1¼" diameter single screw with three heating zones. The extruder gradually rendered the polymer molten and conveyed the melt through a connector or transfer line. Finally, the molten polymer was pushed into a die assembly containing many capillary holes (arranged in the traditional linear fashion) through which emerged small diameter fibers. The fiber diameter was attenuated using high velocity hot air at the die exit as the fibers emerged. The fibrous web ensuing from the die assembly was deposited on a rotating collection drum positioned about 6 inches from the die exit. The web then conveyed onto a wind up spool. The die used had 210 capillary holes with a diameter of 0.025 inch per hole. The processing conditions and resulted properties of melt blown nonwovens are listed in the following Table 5.

TABLE 5

Processing Conditions and Resulted Melt Nonwoven Properties.

|  | Sample | |
|---|---|---|
|  | 1 | 2 |
| Processing Conditions: | | |
| Die Temperature (° C.) | 280 | 280 |
| Die Pressure (psi) | 152 | 152 |
| Air Temperature (° C.) | 240 | 240 |
| Air Pressure (psi) | 33 | 33 |

TABLE 5-continued

Processing Conditions and Resulted Melt Nonwoven Properties.

|  | Sample | |
|---|---|---|
|  | 1 | 2 |
| Extruder Speed (rpm) | 5.9 | 5.9 |
| Throughput (grams/hole/minute) | 0.240 | 0.240 |
| Collector Speed (meters/minute) | 4.0 | 2.5 |
| Nonwoven Properties: | | |
| Base Weight (gsm) | 51 | 80 |
| Fiber Diameter (μm) | 9.0-12.0 | 9.0-12.0 |
| Crystallinity (%) By XRD | 37.3-40.5 | 37.3-40.7 |
| Heat of fusion (J/g) by DSC | 40 | 40 |

Attempts to produce small fiber diameter nonwoven constructs (fiber diameter less than 8 microns) using the same extrusion temperature as was used in Example 6 failed, most likely because the melt viscosity of the molten polymer of Example 4 was too high. This, in turn, was most likely due to the higher molecular weight of the polymer of Example 4.

Subsequent attempts were made to attenuate the fiber size of nonwoven constructs made from the polymer of Example 4. In an effort to reduce melt viscosity, the die temperature was increased to 280° C., although it is generally undesirable to do so for this type of polymer because of unwanted polymer degradation. Additionally, the air pressure was increased to increase air velocity. Even with higher extrusion temperature and higher air pressure, the resulting fiber size was about 9 to 12 micrometers, which was still larger than the nonwoven constructs of Inventive Example 6.

It should be noted that diligent attempts were made to process the copolymer of Example 4 using the same die assembly as was used in Example 6 above. The die used in Example 6 had the same 210 capillary holes but the diameter of each hole was only 0.014 inches as opposed to 0.025 inches. When the die with the smaller holes (0.0014 inches) was used in Example 7, it developed very high pressure, which prevented the process to run steadily because of a variety of problems including melt leakage and mass throughput fluctuation. In addition, it was observed that some nozzles were blocked by the high viscosity melt, which failed to produce a uniform nonwoven construct.

Comparative Example 9

Attempts to Prepare Melt Blown Nonwoven Constructs Using the ε-Caprolactone/Glycolide Copolymer of Example 5

All attempts to prepare melt blown nonwoven constructs using the ε-caprolactone/glycolide copolymer of Example 5 failed because of high viscosity. The equipment employed was that used the previous Examples.

SUMMARY

Some of the data from the examples, both inventive and comparative, are summarized in Table 6 below.

TABLE 6

| Example | IV (dL/g)[1] | | Melt Blown Nonwoven Fiber Size (microns) | Heat of Fusion by DSC[2] (J/g) | |
|---|---|---|---|---|---|
| | Resin | Melt Blown Nonwoven | | Resin | Melt Blown Nonwoven |
| 1 | 1.40 | 1.05 | 2.5 to 6 | 21 | 27 |
| 2 | 1.54 | Not fully soluble | 8 to 11 | 19 | 32 |
| 3 | 1.38 | 1.10 | 2.5 to 6 | 28 | 37 |
| 4 | 1.47 | Not fully soluble | 9 to 12 | 33 | 40 |
| 5 | 1.60 | Not Processable - Too Viscous | | 27 | Not Processable |

[1]Inherent Viscosity, as determined in hexafluoroisopropanol (HFIP) at a concentration of 0.1 g/dL and a temperature of 25° C.
[2]Heat of fusion obtained from the first heat with a constant heating rate of 10° C./min.

All five ε-caprolactone/glycolide copolymers of Table 5 are semicrystalline in nature, as evidenced by the exhibiting significant heat of fusion values. It is thus expected that articles of manufacture can be prepared from all five resins that would be dimensionally stable.

The copolymers of Examples 2 and 4, with inherent viscosity values of 1.54 and 1.47 dL/g, respectively, could be converted to nonwoven constructs by the melt blown process. Fiber diameters lower than 8 microns, however, could not be produced. The diameter of the fibers of constructs from the resin of Example 2 were 8 to 11, while the resin of Example 4 produced constructs having fiber diameters of 9 to 12 microns. The resin of Example 5 could not be processed into nonwoven constructs by the melt blown technique.

Of the ε-caprolactone/glycolide copolymers described, only the inventive copolymers of Examples 1 and 3 could be converted by the melt blown process into nonwoven constructs having fiber diameters less than 8 microns. The inherent viscosities of these copolymers were 1.40 and 1.38 dUg, respectively. The inherent viscosities of the nonwoven constructs made by the melt blown process from the ε-caprolactone/glycolide inventive copolymers of Examples 1 and 3 were 1.05 and 1.10 dL/g, respectively. Thermal analysis by differential scanning calorimetry (DSC) showed that the nonwoven constructs made by the melt blown process from the ε-caprolactone/glycolide inventive copolymers of Examples 1 and 3 exhibited significant crystallinity, as heat of fusion values of 27 and 37 J/g, respectfully, were recorded. These constructs were shown to exhibit dimensional stability when exposed to elevated temperatures, as medical devices might be exposed.

While the subject invention has been illustrated and described in detail in the drawings and foregoing description, the disclosed embodiments are illustrative and not restrictive in character. All changes and modifications that come within the scope of the invention are desired to be protected.

What is claimed is:

1. A method of melt blowing a copolymer, comprising the steps of
   (a) providing a copolymer, the copolymer comprising ε-caprolactone in an amount ranging from 12 to 20 mole percent, glycolide in an amount ranging from 80 to 88 mole percent, crystallinity ranging from 10 and 50% as measured by WAXD or 10 to 50 J/g as measured by DSC, and an inherent viscosity ranging from 0.5 to 1.45 dL/g as measured in a 0.1 g/dl solution of HFIP at 25° C., wherein the copolymer is the reaction product of a predominant amount of a prepolymer of ε-caprolactone and glycolide having a mole ratio of ε-caprolactone/glycolide of less than 30/70, with a balance of glycolide;
   (b) extruding the copolymer through a die assembly, the die assembly having a plurality of spinnerets, to form filament strands;
   (c) attenuating the filament strands with hot air to form microfibers;
   (d) collecting the microfibers on a collector screen; and
   (e) cooling and solidifying the microfibers to form a nonwoven construct comprising microfibers having a diameter ranging from 1 to 8 μm.

2. The method of claim 1, wherein the crystallinity ranging from 10 and 35% as measured by WAXD or 10 to 35 J/g as measured by DSC.

3. The method of claim 2, wherein the crystallinity ranging from 25 to 35% as measured by WAXD or 25 to 35 J/g as measured by DSC.

4. The method of claim 1, wherein the inherent viscosity ranging from 0.74 to 1.45 dL/g as measured in a 0.1 g/dl solution of HFIP at 25° C.

5. The method of claim 1, wherein the nonwoven construct comprises microfibers having diameters ranging from 1 to 6 μm.

6. A nonwoven construct produced by the steps of:
   (a) providing a copolymer, the copolymer comprising ε-caprolactone in an amount ranging from 12 to 20 mole percent, glycolide in an amount ranging from 80 to 88 mole percent, crystallinity ranging from 10 and 50% as measured by WAXD or 10 to 50 J/g as measured by DSC, and an inherent viscosity ranging from 0.5 to 1.45 dL/g as measured in a 0.1 g/dL solution of HFIP at 25° C., wherein the copolymer is the reaction product of a predominant amount of a prepolymer of ε-caprolactone and glycolide having a mole ratio of ε-caprolactone/glycolide of less than 30/70, with a balance of glycolide;
   (b) extruding the copolymer through a die assembly, the die assembly having a plurality of spinnerets, to form filament strands;
   (c) attenuating the filament strands with hot air to form microfibers;
   (d) collecting the microfibers on a collector screen; and
   (e) cooling and solidifying the microfibers to form a nonwoven construct comprising microfibers having a diameter ranging from 1 to 8 μm.

7. The nonwoven construct of claim 6, method of claim 5, wherein the crystallinity ranging from 10 to 35% as measured by WAXD or 10 to 35 J/g as measured by DSC.

8. The nonwoven construct of claim 7, wherein the crystallinity ranging from 25 to 35% as measured by WAXD or 25 to 35 J/g as measured by DSC.

9. The nonwoven construct of claim 6, wherein the inherent viscosity ranging from 0.74 to 1.45 dL/g as measured in a 0.1 g/dL solution of HFIP at 25° C.

10. The nonwoven construct of claim 6, wherein the nonwoven construct comprises microfibers having diameters ranging from 1 to 6 μm.

11. A nonwoven construct comprising a copolymer comprising ε-caprolactone in an amount ranging from 12 to 20 mole percent, glycolide in an amount ranging from 80 to 88 mole percent, said nonwoven construct exhibiting crystallinity ranging from 10 to 50%, as measured by WAXD or 10 to 50 J/g as measured by DSC, wherein the copolymer is the reaction product of a predominant amount of a prepolymer of ε-caprolactone and glycolide having a mole ratio of ε-caprolactone/glycolide of less than 30/70, with a balance of glycolide, and said nonwoven construct comprising microfibers having a diameter ranging from 1 to 8 μm.

12. The nonwoven construct of claim 11, wherein the crystallinity ranges from 10 to 35% as measured by WAXD or 10 to 35 J/g as measured by DSC.

13. The nonwoven construct of claim 12, wherein the crystallinity ranges from 25 to 35% as measured by WAXD or 25 to 35 J/g as measured by DSC.

14. The nonwoven construct of claim 11 comprising microfibers having diameters ranging from 1 to 6 μm.

15. The nonwoven construct of claim 11, wherein the inherent viscosity ranging from 0.74 to 1.45 dL/g as measured in a 0.1 g/dL solution of HFIP at 25° C.

* * * * *